United States Patent [19]

Keryvel et al.

[11] Patent Number: 5,175,832

[45] Date of Patent: Dec. 29, 1992

[54] MODULAR MEMORY EMPLOYING VARYING NUMBER OF IMPUT SHIFT REGISTER STAGES

[75] Inventors: George Keryvel, Versaille; Jean-Louis Thomas, Clamart; Claude Timsit, Fourqueux, all of France

[73] Assignee: Bull S.A, Paris, France

[21] Appl. No.: 355,922

[22] Filed: May 23, 1989

[30] Foreign Application Priority Data

May 25, 1988 [FR] France ............... 88 06910

[51] Int. Cl.⁵ ............... G06F 13/00; G06F 12/00
[52] U.S. Cl. ............... 395/425; 365/221; 365/78; 364/DIG. 1
[58] Field of Search ............... 365/221, 78; 364/200 MS File, 900 MS File

[56] References Cited

U.S. PATENT DOCUMENTS

| | | | |
|---|---|---|---|
| 3,566,363 | 2/1971 | Driscoll et al. | 395/425 |
| 4,156,288 | 5/1979 | Spandorfer | 365/78 |
| 4,809,232 | 2/1989 | Baumbaugh et al. | 365/221 |
| 4,899,310 | 2/1990 | Baba et al. | 365/189.05 |
| 4,918,600 | 4/1990 | Harper, III et al. | 395/425 |

FOREIGN PATENT DOCUMENTS 0014926 9/1980 European Pat. Off. .
2536884 11/1983 France .

OTHER PUBLICATIONS

IEEE Proceedings on the 4th Annual Symposium on Computer Architecture, Mar. 23-25, 1977, pp. 90-94, IEEE, New York, U.S.; S. R. Ahuja et al.: "A modular memory scheme for array processing", col. 3, lines 37-74; FIGS. 1, 6.

Primary Examiner—Joseph L. Dixon
Assistant Examiner—Gregory D. Leibold
Attorney, Agent, or Firm—Weingarten, Schurgin, Gagnebin & Hayes

[57] ABSTRACT

A memory including several modules with each module receiving at the input requests coming from a processor and furnishing at the output the responses to these requests. The requests are transmitted to the input of each module via an input shift register. The responses coming from a module are transmitted to the input of a processor via an output shift register. The number of stages of the input shift register is different for each of the modules and the total number of stages for the input and output shift registers associated with one of the modules is constant and independent of the module in question.

20 Claims, 5 Drawing Sheets

MODULAR MEMORY EMPLOYING VARYING NUMBER OF IMPUT SHIFT REGISTER STAGES

BACKGROUND OF INVENTION

1. Field of the Invention

The present invention relates in general to computer memories, currently referred to as main memories used in central processing units. More particularly, the present invention relates to a modular memory for use in a high performance computer system employing, for example, vector processors. Modular memories in accordance with the present invention may be in the form of semiconductor memories, such as static storage memories.

2. Background Discussion

A central processing unit is generally comprised of one or more processors connected to a main memory via a memory controller. The processors normally access data contained in the memory by sending commands to the memory controller in the form of command signals (read or write commands), address signals and data signals, in the case of a write command. The command signals are generally preceded or accompanied by a request signal that alerts the memory controller that a request has been sent.

In response to such a request, the memory controller then performs a series of operations that include loading the request parameters into an input register. Generally, the memory controller also sends acknowledgement signals to inform the processor that the request has been accepted, and then that the response is available in the memory controller's output register.

The response includes data contained in the address furnished by the processor in the case of a read operation. The response can also include an error report to inform the processor whether the operation requested has been performed correctly.

The basic parameters for evaluating the performance of a memory are access time and cycle time. Access time is defined as being the amount of time between the sending of a request by the processor and the appearance of an acknowledgement signal indicating that the request has been retrieved by the memory, thus indicating that a new request can be sent to the memory by the processor. Cycle time defines the time between when a request is received by the memory and the time when the response is available in the memory's output register.

The way computers are presently designed, memories have increasingly large capacities. On the other hand, they are trying to make processors with increasingly higher performance, that is, with more memory access per second. Various techniques are used to increase processor performance, such as using multiprocessor systems and/or so-called "pipeline" architecture.

However, to make good use of the progress made in processors, it is also desirable for the performance of the memories to be compatible. Memories are therefore designed with the shortest possible access and cycle times. But these conditions are difficult to reconcile with an increase in memory capacity since, with the present technology, a memory's access time increases with its capacity.

To resolve this problem, one classic solution is to use a memory composed of several modules, with each module consequently having an access time that is lower than that of a nonmodular memory with the same capacity. Also, an interlacing technique, where successive requests sent by the processors are addressed to different memory modules in succession, is being used.

However, this solution poses another problem, which is that of the connections between the processors and the various memory modules. One method that is already known uses different access paths for each of the modules. A processor is then connected to modules via an interconnecting circuit with as much connection as the memory has modules. In the case of a multiprocessor system, such as a vector processor, the interconnecting circuit functions just like a "crossbar" system. This method has the advantage of authorizing some simultaneous access by the processors with several memory modules. However, this solution is limited to cases where the number of modules and processors is relatively small. In fact, beyond about ten modules, the interconnection device becomes difficult to design and control. Moreover, it entails increasing the system's cycle time.

Another known solution avoids this drawback by using a bus-type connection between the processors and the different modules. In this case, one memory controller per module is specified, and each controller is supplied with an input register and an address decoder. Usually, two separate busses are used to transport commands and responses so that, in the interlaced mode, the total memory access time is equal to the access time of one module divided by the number of modules.

However, this last solution has the following disadvantage. The response to a request addressed to any module whatsoever in the memory is available in the output register of the module at the end of a period of time that corresponds to the time that the processor sends the request to the module plus the cycle time of the module. Now, the sending time and the cycle time can vary from one module to another. These differences become quite considerable when the processor's cycle time decreases and the number of modules increases, for then the responses to two successive commands addressed to two different modules can appear simultaneously on the output bus.

Accordingly, it is an object of the present invention to eliminate the aforementioned disadvantages by ensuring that the responses coming from the different modules are received in succession by the processor in an order substantially identical to the order in which the corresponding requests were made and accepted by the modules.

SUMMARY OF THE INVENTION

To accomplish the foregoing and other objects, features, and advantages of the invention there is provided a memory with several modules adapted to receive requests from at least one processor, with the requests in the form of command signals, addresses and possibly data. Each module is comprised of means for decoding the requests appearing on its input and means for furnishing response signals to the requests. In accordance with the invention, the requests are transmitted to the input of each of the modules by an input shift register. The responses coming from the modules are transmitted to the input of the processor by an output shift register. The number of stages of the shift register is different for each of their modules and the total number of stages of the input and output registers associated with the modules is constant and independent of the particular module in question.

The invention offers the further advantage of bypassing the use of a complex centralized synchronization system and permitting total memory modularity. Moreover, the invention makes possible an especially simple design where the memory includes only one input shift register and only one output shift register common to all modules, with the output of the processor connected to the input of the first stage of the input shift register, and the input of the processor connected to the output of the last stage of the output shift register. The output of each stage of the input shift register is connected to the output of one of the modules, and the output of the module is connected to the output of the equivalent stage of the output shift register.

The preceding solution makes possible the performance sought in the interlaced mode. However, the memory should not be limited to this function mode and therefore there is a mechanism that prohibits a request from addressing a module that has just been addressed by a preceding request less than a certain minimum time before, and this time corresponds to the module's access time. This problem also exists in the system with the bus mentioned previously. To solve this problem, a window system managed by the processor is provided.

A time-fill inhibitor circuit outside the processor can also be provided to prohibit a command addressed to a module from being sent and to yield to a first command addressed to the same module after a period of time less than a certain duration which is a function of the total access time for each module.

Although these solutions solve the problem of successive requests that are too close together colliding, the result is to complicate either the processor or the inhibitor circuit. This solution offers the further disadvantage of increasing the system's total cycle time.

According to one version of the invention, the preceding problem is thus solved by the following principle: for each request coming from the processor, an associated indicator (oe flag) is generated. When the request is accepted by one of the memory modules, this indicator assumes another value that means the request has been accepted by the module. Thus, it can be determined whether a new request can be sent by the processor as a function of the value of this indicator.

In accordance with the invention an acknowledgement request circuit associated with each module is provided to generate an indicator associated with each request. The request acknowledgement circuit sets said request indicator to a first set value when an acknowledgement signal delivered by the module indicates that the module accepts the request at its input and that the input shift register contains an additional stage placed downstream from the last stage of the shift register. The output of the additional stage is connected to a request control circuit matched to the processor. The request control circuit has a request selection device authorizing the transfer to the input of the input shift register of either a new request if the value of the indicator contained in the supplementary stage is equal to the first set value or of the request contained in the additional stage in the opposite case, with the request indicator matched to any new request assuming second set value.

A problem analogous to the preceding one also arises in a case where a single output shift register is being used to convey responses from various modules. Indeed, it can produce situations where a response contained in the stage of the shift register placed upstream from one of the modules comes into conflict with the response available in the output of that module.

One solution could be to provide an address control mechanism at the processor stage to prevent this type of situation in all cases. But this solution complicates the processor's work, which lowers its performance.

Thus, according to another version of the invention, this problem is resolved in a way similar to the solution to the preceding problem. For this purpose, the output shift register includes a additional stage placed downstream from the last stage and upstream from the first stage of the output shift register. The output of the additional stage is connected to the input of the processor and to the input of a response acknowledgement circuit matched to the processor. The response acknowledgement circuit includes means for matching to each response transferred to the first stage of the output shift register a response indicator conveyed by the output shift register. The response indicator takes on a certain first set value if the response is accepted by the processor. This module is matched to a response control circuit that has a response selection device which authorizes transfer to the stage downstream from the module:

either a response available at the output of the module if the value of the response indicator contained in the stage located upstream of the module is equal to said first set value.

or a response contained in the stage upstream in the opposite case.

Further, the response control circuit includes means for setting the response indicator to a second set value if a response coming from the module is transferred to the stage downstream

BRIEF DESCRIPTION OF THE DRAWINGS

Numerous other objects, features, and advantages of the invention should now become apparent upon a reading of the following detailed description taken in conjunction with the accompanying drawings in which.

DETAILED DESCRIPTION

Figure 1:
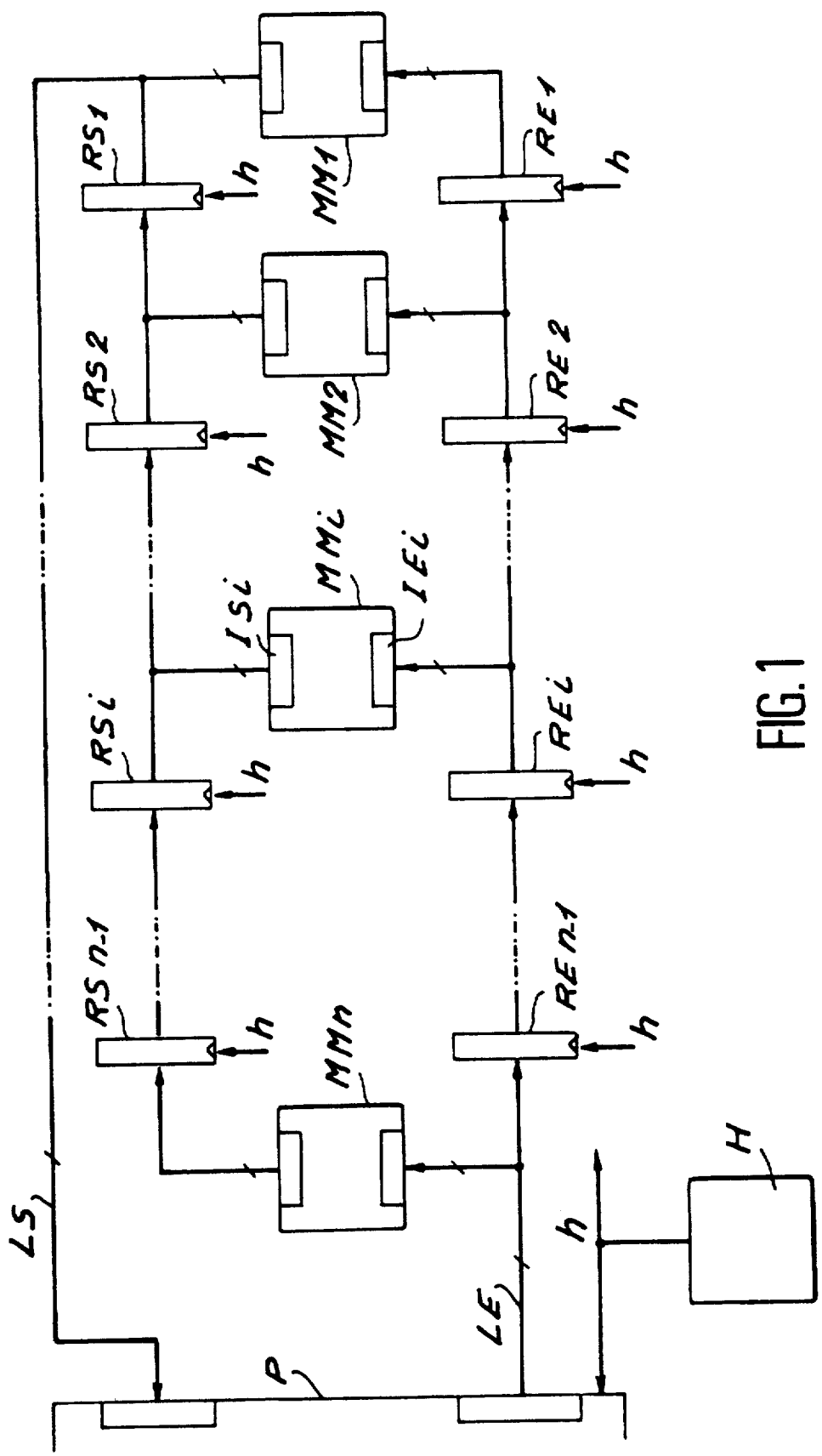
FIG. 1 is a block diagram of one embodiment of the present invention.

FIG. 1 is a block diagram of one embodiment in accordance with the present invention. The memory includes several memory modules $MM_1$, $MM_2$, ..., $MM_i$, ... $MM_n$. The memory cooperates with a utility device such as a processor P, and communicates with it by its input-output interfaces.

Each module $MM_i$ includes an input interface $IE_i$ to receive requests from the outside, with a request corresponding to a read or write command in the module in question. Generally, a request consists of a function code that defines the operation to be performed by the memory, address information and, in the case of a write, write data. The request can also include an origin tag that identifies the command.

The input interface $IE_i$ includes an input register that memorizes the requests received, as well as an address decoder that selects the module in question, for example, in response to the address received. The output interface $IS_i$ is connected to the memory output lines. The output interface $IS_i$ includes an output register that stores the commands before they are retrieved by the processor.

A response consists of the data read, which, in the case of a read, is generally accompanied by an error report that informs the processor whether or not the operation requested has been correctly performed. A response can also include a destination tag that identifies the response. Generally, the tags of origin for a response and the destination tags for the corresponding response are identical. In the case of a processor composed of several basic processors, the tag can identify the basic processor that made the request.

The processor provides responses on the input lines LE via an output interface circuit including one or several registers. A processor input interface also including one or more registers receives responses from the memory via the output lines LS.

According to the invention, the requests coming from the processor access the various memory modules via an input shift register made up of stages $RE_1$, $RE_2$, ... $RE_i$, ... $RE_{n-1}$. The input lines LE are connected to the input of the first stage $RE_{n-1}$ of the input shift register and the output of each stage $RE_i$ is connected to the input of a corresponding module $MM_i$, as well as to the input of the following $RE_{i-1}$ stage. The first $MM_n$ module can be connected directly to the input lines LE.

The memory also includes an output shift register made up of stages $RS_1$, $RS_2$, ... $RS_i$, ... $RS_{n-1}$. Each stage $RS_i$ of the output shift register has its output connected to the output of a corresponding $MM_i$ output module and to the input of the following $RS_{i-1}$ stage.

Each stage of the input and output shift registers receives on its clock input a clock signal h provided by a clock circuit H. This clock signal h is also applied to the processor P to synchronize it.

The device in FIG. 1 operates in the following way: at the time of a read or write operation commanded by the processor P, the latter delivers on the input line LE a succession of requests $D_1$, $D_2$ ... $D_x$ at the rate of the clock signal h. Each time that it is possible, the processor accesses the memory in the interlaced mode and, in this case, the first request $D_1$ is addressed to the module $MM_1$, the second request $D_2$ is addressed to the module $MM_2$, etc ... After n requests have been sent, that is, after n shifts, the requests $D_1$, $D_2$, ... $D_{n-1}$, are available in the outputs of stages $RE_1$, $RE_2$, ... $RE_{n-1}$, respectively, with the request $D_n$ available at the output of the output register of the processor P. Thus, the modules $MM_i$ simultaneously receive a request sent to them. After the module's cycle time, the responses are available in the output of the modules $MM_i$ and can be entered into the corresponding downstream stage $RS_{i-1}$ of the output shift register. At each shift caused by the clock signal h, the processor receives a response, in which the order of arrival corresponds to the sending order of the corresponding request.

Note, then, that the total access time to the data is totally independent of the module in which these data are found.

The memory is also able to function in a noninterlaced mode, that is, where successive requests are addressed to any modules whatever. Taking into account the fact that the cycle time of the shift registers is set very low at the access time of the modules, it is necessary to prevent two close requests from being addressed to the same module. Similarly, it is necessary to prevent a response coming from a module from conflicting with a response placed in the stage located upstream from that module. These situations can be avoided by an address management mechanism commanded by the processor. However, this solution has the disadvantage of making the processor's job more difficult and risks lowering its performance.

Figure 2:
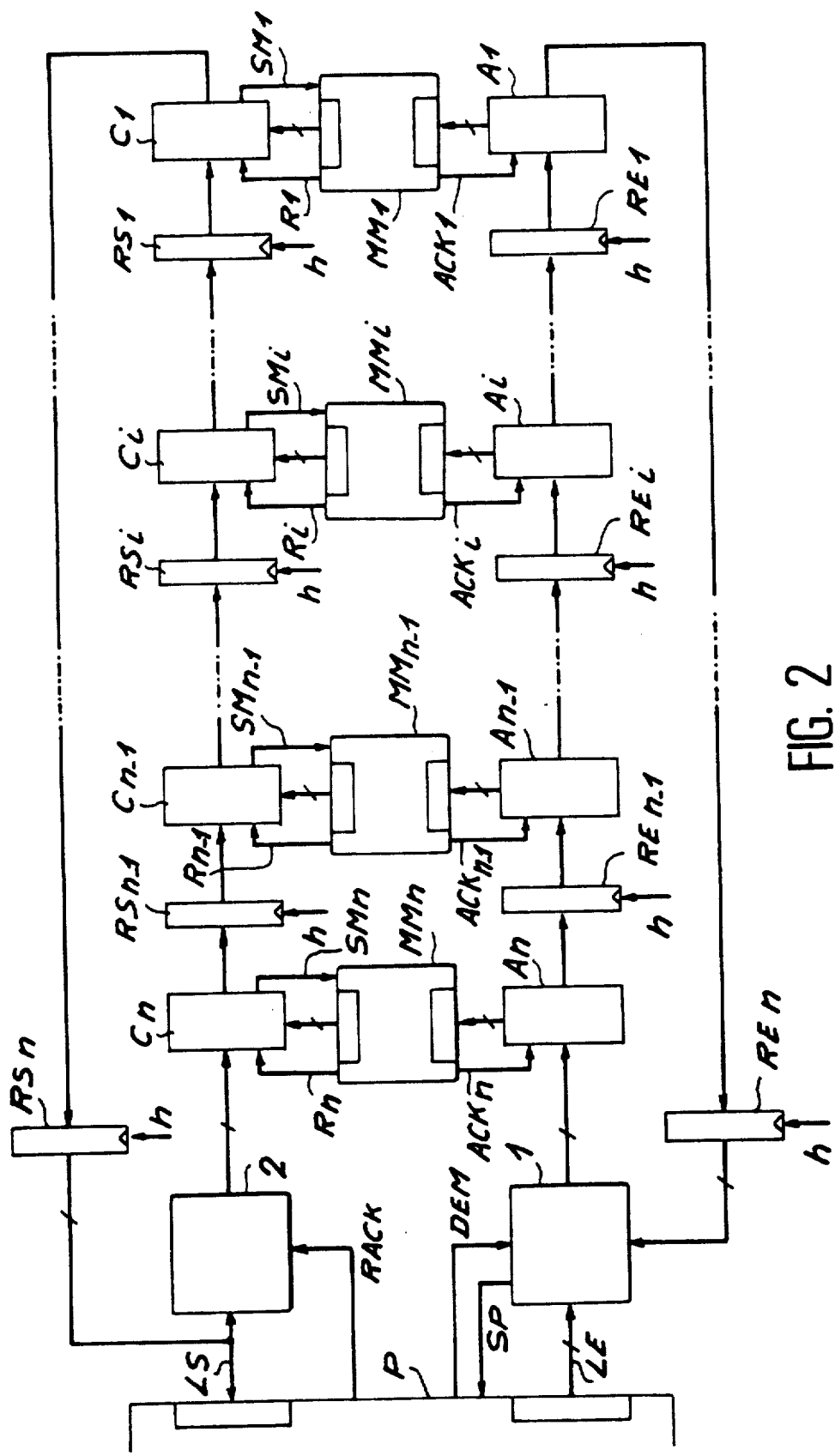
FIG. 2 is a block diagram of an alternate embodiment of the invention.

The version shown in FIG. 2 makes it possible to solve this problem without the disadvantages previously mentioned. FIG. 2 shows with the same reference signs the memory modules, the input and output shift registers and the processor. Compared to FIG. 1, FIG. 2 has the following differences. First of all, the input shift register is supplemented by an additional stage $RE_n$ located downstream from the last stage $RE_1$ of the input shift register. The output of this additional stage $RE_n$ is connected to a request control circuit 1.

Moreover, each memory module $MM_i$ is coupled to a corresponding acknowledgement circuit $A_i$ whose input is connected to the upstream stage $RE_i$ of the input shift register and whose output is connected to the downstream state $RE_{i-1}$. Another output of the acknowledgement circuit $A_i$ is connected to the input of the matching module $MM_i$. The acknowledgement circuit $A_i$ also receives an acknowledgement signal $ACK_i$ coming from the matching memory module.

The request control circuit output 1 is directly connected to the acknowledgement circuit input $A_n$ corresponding to the module $MM_n$. The request control circuit 1 is connected to the output interface of the processor P by the input lines LE. The circuit 1 also receives from the processor P a DEM signal indicating that the processor is ready to send a new request. Lastly, the circuit 1 gives the processor P a signal SP which will be defined further on.

Although not visible in FIG. 2, the stages $RE_i$ of the input shift register include, in addition to flip-flops assigned to the request signals, an additional flip flop and the connections between the stages include a additional line matched to this flip-flop. The purpose of this flip-flop and of this additional line is to be able to convey a binary indicator B whose logic value indicates whether or not the matching request has been retrieved by one of the memory modules.

The detailed operation of the acknowledgement circuits and the request control circuit will be explained in more detail with reference to FIG. 3. Nonetheless, the general operation of the input shift register according to the version in FIG. 2 can be discussed.

Assuming that a request can be sent to the memory, the control circuit 1 outputs the request accompanied by the indicator B whose logic value indicates the presence of a valid request, that is, one not yet accepted by the memory. This request and the matching indicator progress in the shift register so long as they have not reached the destination module identified by the address. When the request arrives in the stage located upstream from the destination module, the address contained in the request is recognized by this module and if this module is available, it transmits an acknowledgement signal $ACK_i$ to the acknowledgement circuit $A_i$. At the following clock cycle, the request is transmitted to the downstream stage but the acknowledgement circuit forces the indicator B to a logic value indicating that the request has been accepted by the module $MM_i$. If the module is not available, it sends an acknowledgement signal $ACK_i$ with the complementary value. At the next clock time, the request is also transmitted to the downstream stage but the indicator B keeps its initial value. The request and its indicator then progress to the input shift register and arrive at the additional stage $RE_n$.

When the processor is ready to send a request, it establishes the signal DEM at a first set value. This signal is received by the request control circuit 1 which includes means for testing the logic value of the indicator B contained in the stage $RE_n$. If the value of the indicator B indicates a valid request, the request and the indicator contained in the register stage $RE_n$ are transmitted to the input of the first acknowledgement circuit $A_n$ and processor's request is not authorized to enter the shift register. If the indicator contained in the register stage $RE_n$ indicates an invalid request, the processor's request enters the shift register by the output line of the request control circuit 1. The processor is informed whether or not its request is accepted by the signal SP given by the request control circuit 1.

We see that this solution solves the problem previously raised, for if two requests too close together are given to the same memory module, the second request which cannot be retrieved by this module, continues to progress in the shift register and will be reintroduced at the input of this register after n shifts. This request will be made again at the input of the destination module and a new attempt to retrieve will be made.

The embodiment of FIG. 2 also has changes in the output shift register compared to FIG. 1.

Each module $MM_i$ is coupled to a corresponding response control circuit $C_i$ connected to the output of the corresponding module. Each response control circuit has another input connected to the output of stage $RS_i$ located upstream from the corresponding module and has its output connected to the input of the stage $RS_{i-1}$ located downstream from the corresponding module. Each response control circuit $C_i$ also receives a signal $R_i$ coming from the matching module whose logic value represents a response available in the output of the module.

The response control circuit $C_1$ corresponding to the last module $MM_1$ has its output connected to an additional stage $RS_n$ of the output shift register. The response control circuit $C_n$ corresponding to the first module $MM_n$ has an input connected to the output of a response acknowledgement circuit 2 whose input is at the same time connected to the output of the additional stage $RS_n$ and to the input of the processor P. The response acknowledgement circuit 2 also receives from the processor P a signal RACK, whose logic value indicates a response accepted by the processor.

Each stage $RS_i$ of the output shift register includes an additional flip-flop (not shown), and the connections linking the stages between them include an additional line. The additional flip-flop and the additional line make it possible to convey a response indicator $B_r$ with a first logic value when the matching response has already been accepted by the processor and a second logic value when this response has not been accepted.

The output shift register in FIG. 2 works in the following way. When a valid response, that is, one not yet accepted by the processor, is present in the additional stage $RS_n$ and this response is accepted by the processor, it sends the response acknowledgement circuit 2 a signal RACK with a first logic value indicating that the response has been accepted. The response acknowledgement circuit 2 then transmits the response contained in the stage $RS_n$ toward the response control circuit $C_n$ of the first module $MM_n$. The response acknowledgement circuit 2 simultaneously forces the matching response indicator $B_r$ to the first logic value.

If the response is not accepted by the processor, it sends a signal RACK with a second logic value and in response to that signal, the response acknowledgement circuit 2 transmits the response contained in the stage $RS_n$ and the matching indicator $B_r$ directly to the response control circuit $C_n$ with no changes.

When a module $MM_i$ has a response ready, it sends to the matching response control circuit $C_i$ a signal $R_i$ with a first logic value. If the indicator $B_r$ contained in the stage located upstream from the module has a first set logic value, the response control circuit $C_i$ puts in communication the output of the matching module with the input of the stage $RS_{i-1}$ located downstream from that module. The response control circuit $C_i$ simultaneously sets the matching response indicator $B_r$ to the second logic value and transmits it to the corresponding flip-flop of the stage downstream $C_{i-1}$.

If the indicator contained in the stage located upstream from the module has a value equal to the second logic value, the response available in the module output is blocked and the contents of the stage upstream $RS_i$ is transmitted directly to the stage downstream $RS_{i-1}$. When a response available in a module $MM_i$ has been entered in the output shift register, that is conveyed to the module $MM_i$ by the signal $SM_i$.

The output shift register according to FIG. 2 thus makes it possible to avoid a collision between two responses, one coming from a memory module, the other coming from the stage located upstream from that module.

Figure 3:
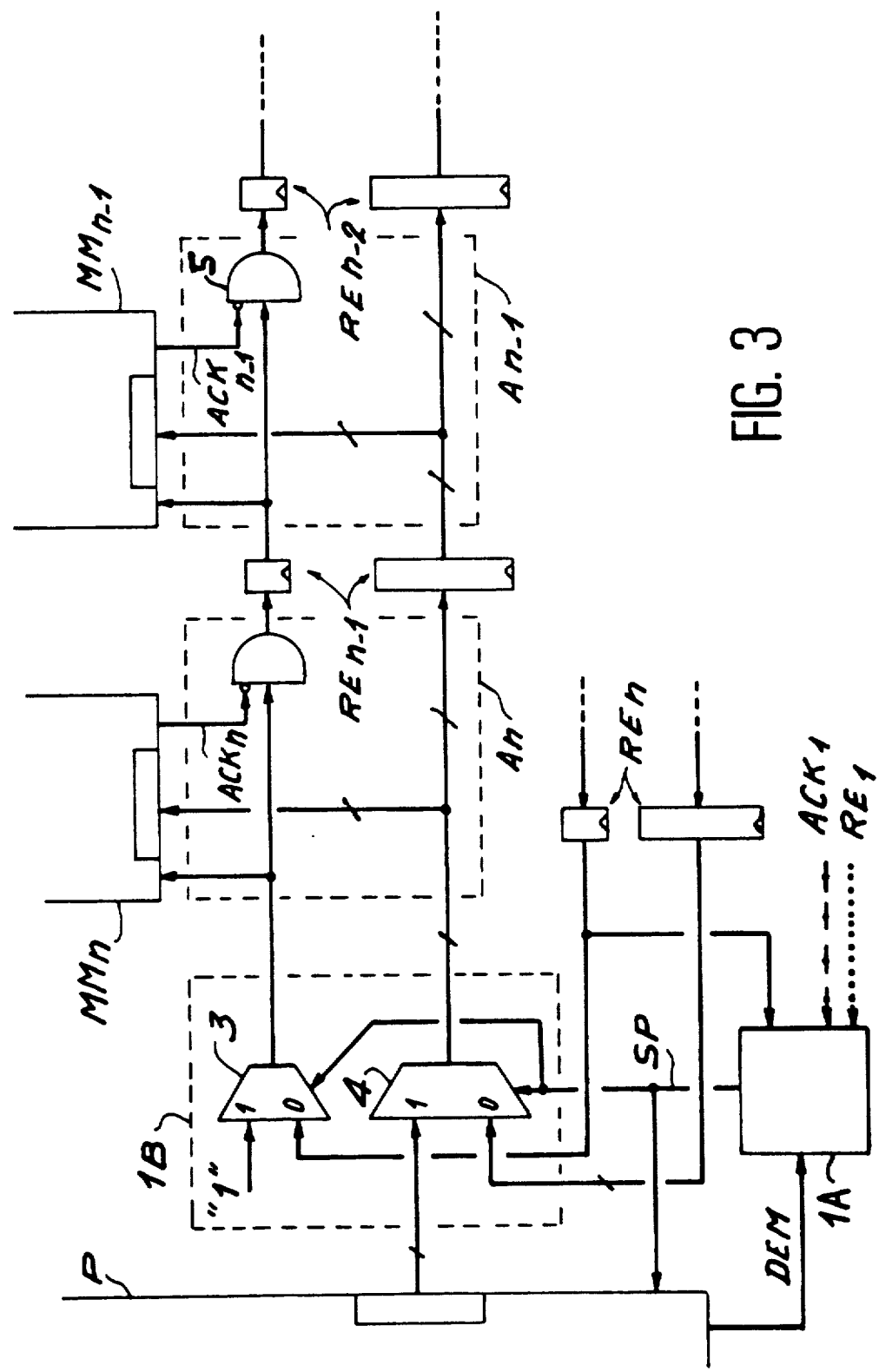
FIGS. 3 and 4 illustrate further details for variations of the embodiment of FIG. 2.

FIG. 3 shows in more detail the response control circuit 1 and the acknowledgement circuits $A_i$ used in FIG. 2.

The response control circuit 1 includes a selection circuit 1B and a command circuit 1A. The selection circuit 1B includes a primary two input multiplexer 3, a primary input receiving a fixed logic signal, with the other input connected to the flip flop of the stage $RE_n$ containing the indicator B. A secondary two-input multiplexer 4 has its primary input connected to the output of the processor and its second input connected to the outputs of the other flip-flops of the stage $RE_n$. The two multiplexers 3 and 4 are controlled by a signal SP coming from the command circuit 1A. The command circuit 1A receives the indicator contained in the stage $RE_n$ and the signal DEM.

In the version shown, it is assumed that the indicator is a binary element which, when it assumes the logic value 1, indicates that the request is valid, or not yet accepted by the memory. When the indicator takes the logic value 0, the matching request has been accepted by the memory. Moreover, it is assumed that when the signal SP takes the logic value 1, the multiplexers 3 and 4 connect their upper input with their output. Lastly, it is assumed that the DEM signal takes the logic value 1 when a request appears at the processor output.

The request control circuit works in the following way. The control circuit 1A delivers the signal SP with the logic value 1 when the indicator B has the logic value 0 and when the signal DEM has the logic value 1. The signal SP takes the logic value 0 in opposite cases. Thus, when signal SP is equal to 1, the request at the processor output is transmitted to the multiplexer 4 output and simultaneously the indicator B takes the logic value 1 at the output of the multiplexer 3. If signal SP is equal to 0 the contents of the stage $RE_n$ are then present at the outputs of the multiplexers 3 and 4. The signal SP is also transmitted to the processor P to tell it whether or not its request has entered the input shift register.

The command circuit 1A is not described in detail herein as it is considered to be of known design.

The acknowledgement circuits $A_n$ and $A_{n-1}$ coupled to the two first modules $MM_n$ and $MM_{n-1}$ are also shown in FIG. 3. The acknowledgement circuit $A_{n-1}$ coupled to the second module $MM_{n-1}$ includes a logic gate 5 with two inputs, the first of which receives the acknowledgement signal $ACK_{n-1}$ from the matching module and the second of which is connected to the output of the flip flop of the stage upstream assigned to the indicator. The output of the gate 5 is connected to the input of the flip flop of the stage downstream assigned to the indicator.

In operation, when a request is addressed to the module $MM_{n-1}$ and this request is present in the register stage $RE_{n-1}$, if the request is valid, that is, if the indicator B contained in the latter register stage has the logic value 1 and if the memory is available, the memory retrieves the request and delivers an acknowledgement signal $ACK_{n-1}$ with the logic value 1. The logic gate 5 then delivers the logic value 0 to its output.

If an invalid request, that is, B equals 0, is contained in the register stage $RE_{n-1}$, this request is connected directly with the stage downstream $RE_{n-2}$ with no change in the indicator B.

The acknowledgement circuit matched to the first module $MM_n$ is identical, with the difference that its inputs are not connected to the stage upstream from the input shift register but to the outputs of the selection circuit 1B.

The other stages of the input shift register are identical to the first and are therefore not shown in FIG. 3.

Figure 4:
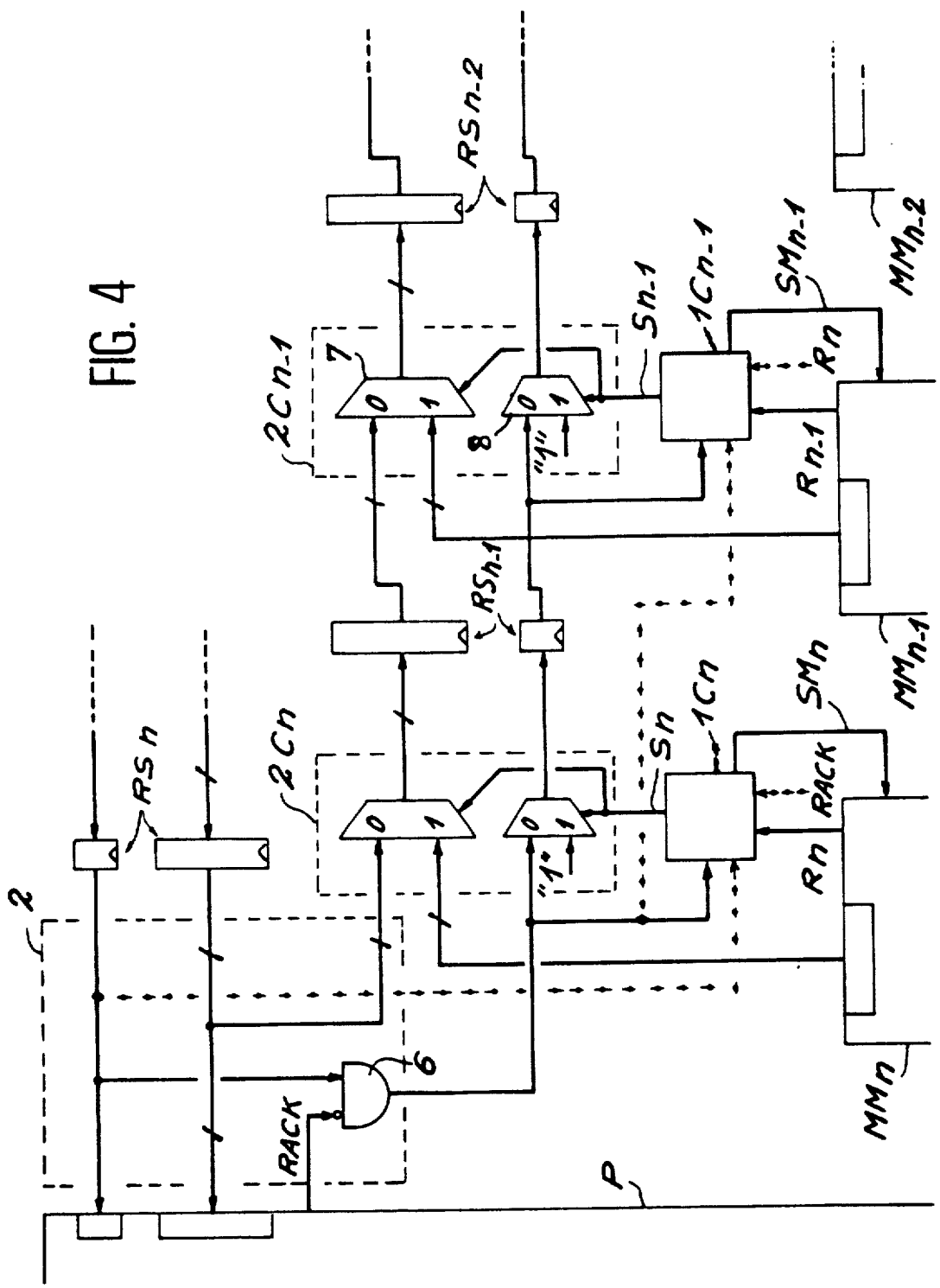

FIG. 4 shows versions of the response acknowledgement circuit 2 and the response control circuit $C_i$.

The response acknowledgement circuit 2 basically includes a logic gate 6 receiving at a primary input the indicator $B_r$ contained in the stage $RS_n$ of the output shift register. The gate 6 receives at its second input the signal RACK coming from the processor P. The output of the gate 6 is connected to the response control circuit of the module $MM_n$.

In accordance with the custom previously explained, when the indicator $B_r$ has the logic value 1, this means that the matching response is valid, that is, that it has not been accepted by the processor. One also assumes that the signal RAC takes the logic value 1 when the processor accepts a valid request.

Taking into account this custom, the response acknowledgement circuit works in the following way. When a response contained in the register $RS_n$ is matched to a response indicator $B_r$ whose logic value is equal to 1, this means that this valid response should be retrieved by the processor. If such is the case, the signal RACK delivered by the processor takes the logic value 1 and the circuit 6 delivers the logic value 0 to the output. In the opposite case, the signal RACK has the logic value 0 and the output of the circuit 6 takes the logic value 1, thus signifying that the request has not been accepted by the processor. If, on the other hand, the indicator $B_r$ contained in the register $RS_n$ has the logic value 0, the output 6 takes the logic value 0 as well.

FIG. 4 shows only the response control circuits matched to the two first modules $MM_n$ and $MM_{n-1}$ since the circuits matched to the other modules are identical.

Now, consider the response control circuit $C_{n-1}$ matched to the second module $MM_{n-1}$. This circuit consists of a selection circuit $2C_{n-1}$ and a command circuit $1C_{n-1}$. The selection circuit $2C_{n-1}$ includes two multiplexers 7 and 8 at the two inputs. The first input of the first multiplexer 7 is connected to the output of the part of the stage $RS_{n-1}$ assigned to the response per se. The second input of the multiplexer 7 is connected to the output of the module $MM_{n-1}$. The first input of the second multiplexer 8 is connected to the output of the flip flop of the stage $RS_{n-1}$ assigned to the response indicator $B_r$. Its second input is maintained at the logic value 1.

The command circuit $1C_{n-1}$ is connected at input to the output of the flip-flop of the stage $RS_{n-1}$ containing the response indicator $B_r$. The circuit $1C_{n-1}$ also receives the signal $R_{n-1}$ from the module $MM_{n-1}$. It is assumed that the signal $R_{n-1}$ takes the logic value 1 when a request is available in the module. The output $S_{n-1}$ of the circuit $1C_{n-1}$ is connected to the command input of the two multiplexers 7 and 8. When the signal $S_{n-1}$ has the logic value 1, the multiplexers 7 and 8 connect their lower input with their output. The command circuit $1C_{n-1}$ is made so that when the signal $R_{n-1}$ has the logic value 1 and the indicator $B_r$ has the logic value 0, the signal $S_{n-1}$ takes the logic value 0, thus authorizing the transfer of the response present in the output interface of the module to the stage downstream $RS_{n-2}$. At the same time, the indicator $B_r$ provided to the register downstream takes the logic value 1.

If the response indicator $B_r$ contained in the register $RS_{n-1}$ has the logic value 1, which thus means that the response is valid, the command circuit $1C_{n-1}$ delivers a signal $SM_{n-1}$ to the module $MM_{n-1}$ to inform that module that the response cannot enter into the response shift register. Moreover, the signal $S_{n-1}$ takes the logical value 0 and the request contained in the stage $RS_{n-1}$ is integrally transferred into the register downstream $RS_{n-2}$. The result is that the response indicator introduced into the downstream register keeps the logic value 1. Of course, if no response is available in the module $MM_{n-1}$, with the signal $R_{n-1}$ then taking the logic value 0, the signal $S_{n-1}$ takes the logic value 0, thereby authorizing the transfer of the request contained in the stage $RS_{n-1}$ with no change to the stage $RS_{n-2}$.

The response control circuit $C_n$ matched to the first module $MM_n$ is identical but the primary input of the second multiplexer is connected to the output of the logic gate 6 of the response acknowledgement circuit 2.

Figure 5:
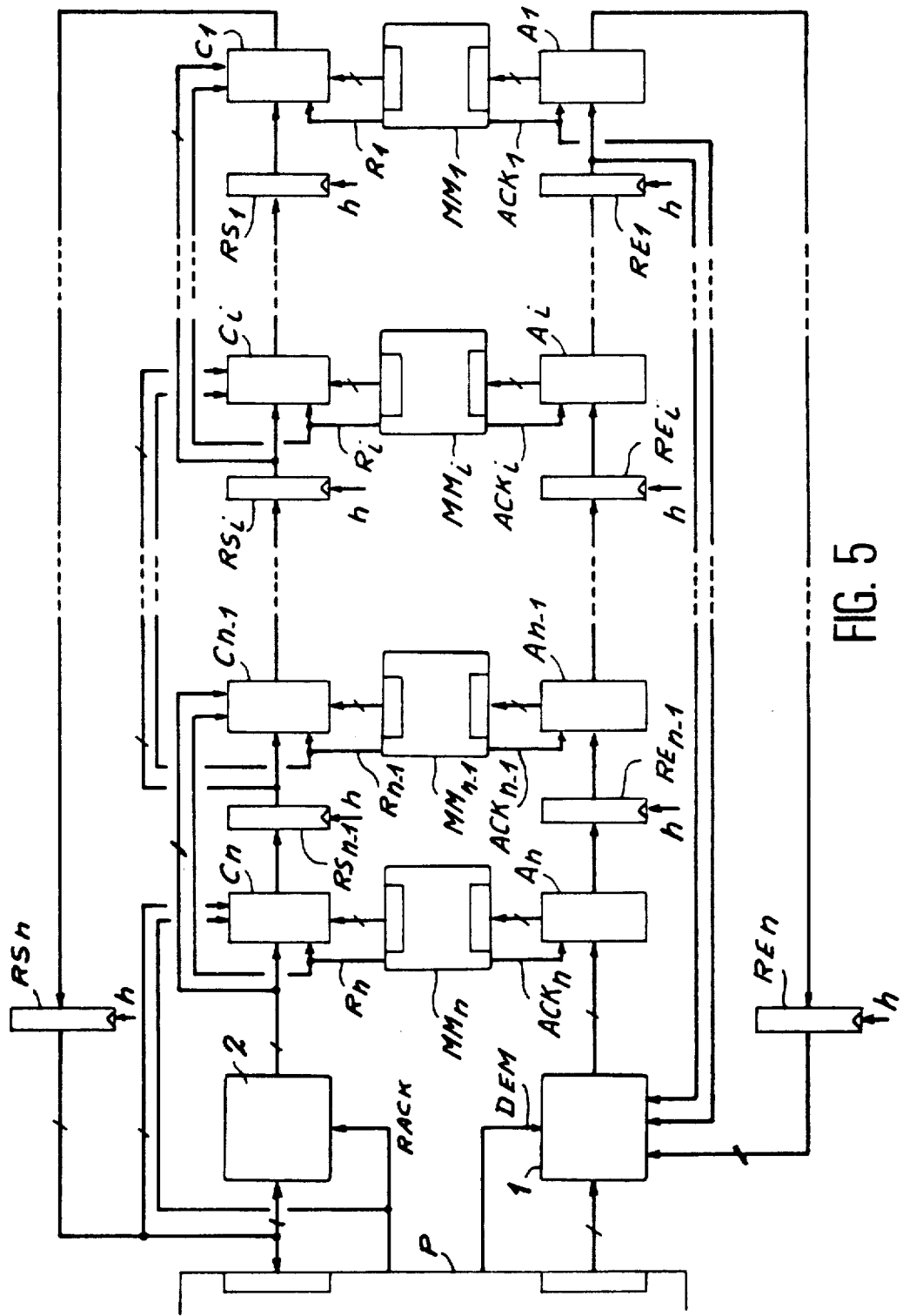
FIG. 5 is a block diagram for still a further embodiment of the present invention.

FIG. 5 shows another version of the memory, according to the invention. In this figure, we see with the same references the elements already shown in FIG. 2. However, according to this version, the response control circuits C1, ... $C_i$, ... , $C_n$ are connected to the outputs of the stage located upstream from the preceding module These circuits $C_i$ also get the signal $R_{i+1}$ from the module upstream $MM_{i+1}$.

According to this version, the response control circuits $C_i$ are designed to determine with an advance cycle time the conditions for authorizing the transfer of a response from the corresponding module $MM_i$ to the stage downstream from the output shift register.

If we consider the second response control circuit $C_{n-1}$ corresponding to the second module $MM_{n-1}$, this circuit will authorize the transfer of a response available in the corresponding module $MM_{n-1}$ when no valid response is present upstream from the module $MM_n$ and no response is available in this module.

According to this version, there is an anticipation mechanism making it possible to offset possible delays introduced by the response control circuit of the preceding stage.

For similar reasons, an anticipation mechanism is also provided in the input shift register. According to this other version, the response control circuit 1 is connected to the output of the stage $RE_1$ and receives the signal $ACK_1$ given by the module $MM_1$. The response control circuit 1 is then made in such a way that a request coming from the processor P is authorized to enter the input shift register when a request contained in the stage $RE_1$ is invalid or when this request is valid while the signal $ACK_1$ indicates that this request will be accepted by the module $MM_1$ since its destination is that module and the module is available.

According to this design, the response acknowledgement circuit 2, the response control circuits $C_i$, the request control circuit 1 and the acknowledgement circuits $A_i$ do not need additional explanations since they are entirely within the scope of the expert, taking into account the explanations already given with reference to FIGS. 3 and 4, where changes to be made in the connections are shown in dotted lines.

In summary, in accordance with the present invention, it is noted that the number of stages of a shift register between the processor key P and a particular memory module for a request that is to be transmitted from the processor to that module, depends on that module in such a way that one does not have the same number of stages for two different modules. The same also applies for responses.

For example, a request is transmitted to $MM_1$ through $RE_{n-1}, \ldots, RE_i, \ldots, RE_2, RE_1$, that is n−1 stages. A request transmitted to $MM_2$ through $RE_{n-1}, \ldots, RE_i, \ldots, RE_2$, that is n−2 stages, etc.

A response from $MM_1$ is transmitted to processor P through O stage. A response from $MM_2$ is transmitted through $RS_1$, that is 1 stage. Thus, the total number of stages of the input and output shift registers associated with one of the modules is considered to be constant and independent of the module in question.

What is claimed is:

1. A memory comprising:
   a plurality of memory modules each of said memory modules having an input port and an output port and each of said memory modules adapted to receive a request signal from at least one processor, said request signal being in the form of a first one of a command signal and an address signal, with each of said memory modules comprising:
   a decoder, coupled to the input port of said memory module, for decoding said request signal appearing at the input port of the memory module; and
   a response circuit coupled to the output port of the memory module for providing a response signal in response to said request signal;
   an input shift register means having a plurality of stages, said input shift register means coupled to the input port of each of said memory modules, said input shift register means for transmitting the request signal from an output port of said processor to the input port of each of said memory modules; and
   an output shift register means having a plurality of stages, said output shift register means coupled to the output port of each of said memory modules, said output shift register means for transmitting a response signal from the output port of each of said memory modules to an input port of said processor, with the number of stages of said input shift register means through which the request signal is conveyed being different for each of the memory modules, and the total number of stages of the input shift register means and output shift register means through which the request signal to and the response signal from a particular one of said plurality of memory modules are conveyed being constant and independent of the particular memory module.

2. The memory of claim 1, wherein:
   the input shift register means comprises an input shift register;
   the output shift register means comprises an output shift register;
   the output port of the at least one processor is coupled to an input of a first stage of said input shift register;
   the input port of the at least one processor is coupled to an output of a last stage of said output shift register;
   an output of each stage of the input shift register is coupled to the input port of a corresponding one of said memory modules; and
   the output port of each of said memory modules is coupled to the output of the corresponding stage of the output shift register.

3. The memory of claim 2 further comprising
   a plurality of request acknowledgement circuits each of said request acknowledgement circuits coupled to the input port of a corresponding one of said memory modules, with each of said request acknowledgement circuits for generating, in response to each request signal conveyed by said input shift register to said memory module, a corresponding request indicator with one of said request acknowledgement circuits setting the request indicator to a first set value when an acknowledgement signal delivered by the corresponding memory module indicates that said memory module accepts the request present at its input port; and
   a request control circuit having a first port coupled to the output port of said processor and a second port coupled to the input of the first stage of said input shift register;
   wherein said input shift register further comprises:
   an additional stage placed downstream from the last stage of said input shift register, with the output of said additional stage coupled to a third port of said request control circuit said request control circuit receiving said acknowledgment signal from the memory module coupled to said last stage, with said request control circuit commanding a request selecting device to authorize the transfer of a new request to the input port of the first stage of said input shift register when a first one of the following conditions is met:
   (a) the value of the request indicator contained in said last stage is equal to said first set value; or (b) when, with said indicator having a second set value, the request contained in said last stage is addressed to said last module and said last module is available, with the request indicator corresponding to any new request taking said second set value.

4. The memory of claim 2, wherein the output of said processor is directly connected to the input of a first one of said plurality of memory modules with the output port of said first memory module being connected to the input of the first stage of the output shift register.

5. The memory of claim 4, further comprising:
a plurality of request acknowledgement circuits, each of said request acknowledgment circuits coupled to the input port of a corresponding one of said memory modules, each of said request acknowledgement circuits for generating, in response to each request signal conveyed by said input shift register to said memory modules, a corresponding request indicator with each of said request acknowledgement circuits adapted for setting the request indicator to a first set value when an acknowledgement signal delivered by a corresponding one of said memory modules indicates that said one memory module accepts the request present at its input port; and
said input shift register including an additional stage placed downstream from the last stage of said input shift register, with the output of said last stage coupled to a response control circuit corresponding to said processor, with said request control circuit including a request selecting device authorizing the transfer to the input of said input shift register of a first one of:
a new request, if the value of said indicator contained in said additional stage is equal to said first set value; or
a request contained in said additional stage if the value of said indicator contained in said additional stage is not equal to said first set value, with the request indicator corresponding to any new request taking a second set value.

6. The memory of claim 2, wherein:
said output shift register includes an additional stage located downstream from the last stage and upstream from the first stage of said output shift register, the output of said additional stage being connected to the input of said processor and to the output of a response acknowledgement circuit associated with said processor;
said response acknowledgement circuit includes means of matching to each response transferred to the first stage of said output shift register a response indicator conveyed by said output shift register, with said response indicator taking a first set value if said response is accepted by the processor, each memory module being coupled to a corresponding response control circuit including a response selection device authorizing the transfer to the additional stage located downstream from said memory module, of a first one of:
(a) a response available at the output port of said memory module if the value of said response indicator contained in the additional stage located downstream of said memory module is equal to said first set value; or
(b) a response contained in said first stage if the value of said response indicator contained in the additional stage is equal to said second set value; and
said response control circuit includes means to set said response indicator to a second set value if a response coming from said memory module is transferred to said additional stage.

7. A memory according to claim 6, wherein said response control circuit of a memory module is coupled to the output of the stage located upstream from the preceding memory module and receives from said preceding memory module a signal indicating that said preceding memory module has a response available and that said response control circuit commands said response selection device to authorize the transfer of a new response available in said memory module to the input of the stage located downstream from said memory module when both of the following conditions are met:
the value of the response indicator contained in said stage upstream equals said first set value; and
when no response is available in the preceding memory module.

8. The memory according to claim 1, wherein:
the request signal contains a function code serving to define the operation to be performed in the memory, said function code corresponding to a first one of:
(a) address data in the case of a write;
(b) a tag in the case of a read; or
(c) an origin in the case of a read; and said responses contain at least:
(a) an error report;
(b) a destination tag corresponding to a first one of:
(i) the tag for the request considered; or
(ii) the origin for the request considered; and
(c) data.

9. A memory according to claim 8, wherein said processor comprises a number of basic processors, and said tag of origin is representative of the identity of the basic processor which sent the request.

10. The memory of claim 3, wherein:
said output shift register includes an additional stage having an input port coupled to the output port of the last stage of said output shift register and having an output port coupled to the input port of said at least one processor and to an input of a response acknowledgement circuit said response acknowledgement circuit being coupled to the input port of said processor;
said response acknowledgement circuit includes means of matching to each response transferred to the first stage of said output shift register a response indicator conveyed by said output shift register, with said response indicator taking a first set value if said response is accepted by the processor, each memory module being coupled to a response control circuit said response control circuit including a response selection device authorizing the transfer to the stage located downstream from said memory module of a first one of:
(a) a response available at the output of said memory module if the value of said response indicator contained in the stage located downstream of said memory module is equal to said first set value; or
(b) of the response contained in said stage upstream if the value of said response indicator contained in the stage located downstream of said module is not equal to said first set value;

the response control circuit including means to set said response indicator to a second set value if a response coming from said memory module is transferred to said stage downstream.

11. The memory of claim 10, wherein:

said response control circuit of a first one of said memory modules is connected to the output of the stage located upstream from a preceding memory module; and said first memory module receives from said preceding memory module a signal indicating that said preceding memory module has a response available and that said response control circuit commands said response selection device to authorize the transfer of a new response available in said memory module to the input of the stage located downstream from said memory module when the value of the response indicator contained in said stage upstream equals said first set value and when no response is available in the preceding memory module.

12. A modular memory system for use with at least one processor, the processor having an output for generating memory requests and an input for receiving memory responses, the modular memory system comprising:

a plurality of memory modules, each memory module comprising:
   (a) an input;
   (b) an output;
   (c) means for decoding requests from the processor; and
   (d) means for providing response signals in response to the requests;

an input shift register having a plurality of serially interconnected stages, each stage having an input and an output, each stage being coupled intermediate a memory module input and one of a second memory module input and the output of the processor, the number of stages operatively coupled between the processor output and the input of a respective memory module being different for each of the memory modules; and an output shift register having a plurality of serially interconnected stages, each output shift register stage having an input and an output and being coupled intermediate a memory module output and one of a second memory module output and the input of the processor, the number of output shift register stages operatively coupled between the processor input and the output of a respective memory module being different for each of said memory modules;

the total number of input shift register stages and output shift register stages operatively coupling a memory module intermediate the processor input and processor output being the same for each of said plurality of memory modules.

13. The module memory of claim 12 wherein:

said input shift register has a first stage and a last stage, the processor output being operatively coupled to the input of the first stage of the input shift register; and the output shift register has a first stage and a last stage, the processor input being operatively coupled to the output of the last stage of the output shift register.

14. The modular memory system of claim 13 wherein:

the processor output is operatively coupled to the input of a first memory module; and the output of the first memory module coupled to the input of the first stage of the output shift register.

15. The modular memory system of claim 14 wherein:

a response acknowledgement circuit is coupled intermediate the input of each memory module and the output of the input shift register stage operatively coupled with each memory module input; and a response control circuit is coupled intermediate the output of each memory module and the input of the output shift register stage operatively coupled with each memory module output.

16. The modular memory system of claim 5 wherein:

a processor request control circuit is coupled intermediate the output of the processor and the input of the first stage of the input shift register; and a processor response acknowledgement circuit is coupled intermediate the input of the processor and the output of the last stage of the output shift register.

17. The module memory system of claim 16 wherein:

the input shift register includes an additional stage coupled intermediate the output of the last stage of the input shift register and the input of the processor request control circuit; and the output shift register includes an additional stage coupled between the output of the last output shift register stage and the input of the processor response acknowledgement circuit.

18. The modular memory system of claim 12 wherein said requests comprise a command signal and an address signal.

19. A memory according to claim 18, wherein:

the requests contain a function code defining the operation to be performed in the memory said function code corresponding to address data and a first one of:
   (a) write data in the case of a write operation; or
   (b) a tag in the case of a read operation; and
wherein said responses comprise:
   (a) an error report;
(b) a destination tag corresponding to a tag of origin for the request considered; and
   (c) data.

20. A memory according to claim 19, wherein said processor comprises a number of basic processors, and said tag of origin is representative of the identity of the basic processor which sent the request.

* * * * *

UNITED STATES PATENT AND TRADEMARK OFFICE
CERTIFICATE OF CORRECTION

PATENT NO. : 5,175,832
DATED : December 29, 1992
INVENTOR(S) : George Keryvel et al.

It is certified that error appears in the above-indentified patent and that said Letters Patent is hereby corrected as shown below:

Column 6, line 22, "downstream state" should read --downstream stage--.

Column 10, line 23, "in the module" should read --in the module $MM_{n-1}$ --.

Column 16, line 24, "of claim 5" should read --of claim 15--.

Signed and Sealed this

Seventeenth Day of May, 1994

Attest:

BRUCE LEHMAN

Attesting Officer

Commissioner of Patents and Trademarks